(12) United States Patent
Kim et al.

(10) Patent No.: US 12,441,330 B2
(45) Date of Patent: Oct. 14, 2025

(54) SOUND CONTROL APPARATUS FOR VEHICLES AND METHOD OF CONTROLLING THE SAME

(71) Applicants: Hyundai Motor Company, Seoul (KR); Kia Corporation, Seoul (KR)

(72) Inventors: Joong Kwan Kim, Gyeonggi-do (KR); Myoung Ok Lee, Seoul (KR); Kang Dok Yee, Gyeonggi-do (KR); Jung Keun You, Gyeonggi-do (KR); Chi Sung Oh, Gyeonggi-do (KR); Mun Hwan Cho, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 287 days.

(21) Appl. No.: 17/560,574

(22) Filed: Dec. 23, 2021

(65) Prior Publication Data

US 2022/0194389 A1      Jun. 23, 2022

(30) Foreign Application Priority Data

Dec. 23, 2020   (KR) .......................... 10-2020-0182397

(51) Int. Cl.
*B60W 40/08*       (2012.01)
*G06V 20/59*       (2022.01)

(52) U.S. Cl.
CPC .......... *B60W 40/08* (2013.01); *G06V 20/597* (2022.01); *B60W 2040/089* (2013.01); *B60W 2540/21* (2020.02)

(58) Field of Classification Search
CPC .......... B60W 40/08; B60W 2040/089; B60W 2540/21; G06V 20/597; G06V 20/59;
(Continued)

(56) References Cited

U.S. PATENT DOCUMENTS 10,440,467 B1 * 10/2019 You ........................ H04R 1/323
2017/0295446 A1 * 10/2017 Thagadur Shivappa . G06F 3/16
(Continued)

FOREIGN PATENT DOCUMENTS

CN          111341313      *  6/2020
JP          4305333 B2     *  7/2009
(Continued)

OTHER PUBLICATIONS

CN 111341313 A machine translation (Year: 2020).*
JP-4305333-B2 machine translation (Year: 2009).*

*Primary Examiner* — Anne Marie Antonucci
*Assistant Examiner* — Jingli Wang
(74) *Attorney, Agent, or Firm* — Fox Rothschild LLP (57) ABSTRACT

A sound control apparatus for a vehicle is capable of implementing a separated sound zone in response to a change in position of a passenger's head. A separated sound zone control method for a vehicle includes determining a current position of the passenger's head, and when the determined current head position corresponds to a predicted head position, outputting an output sound datum corresponding to the predicted head position through a plurality of speakers, where the output sound datum is selected by applying a sound data sample to a control filter set configured to form a separated sound zone corresponding to the predicted head position.

19 Claims, 8 Drawing Sheets

(58) Field of Classification Search
CPC ....... H04R 2499/13; H04R 5/02; H04S 7/303; H04S 1/002; H04S 2420/01; H04S 2420/13; B60R 11/0217
See application file for complete search history.

(56) References Cited

U.S. PATENT DOCUMENTS

| | | | |
|---|---|---|---|
| 2018/0261237 A1* | 9/2018 | Moore | G10L 25/51 |
| 2019/0215604 A1* | 7/2019 | You | G10K 11/178 |
| 2020/0094141 A1* | 3/2020 | Fersch | H04S 7/302 |

FOREIGN PATENT DOCUMENTS

| | | |
|---|---|---|
| KR | 10-2019-0083935 A | 7/2019 |
| KR | 10-2019-0083936 A | 7/2019 |
| KR | 10-2020-0012226 A | 2/2020 |

* cited by examiner

SOUND CONTROL APPARATUS FOR VEHICLES AND METHOD OF CONTROLLING THE SAME

CROSS-REFERENCE TO RELATED APPLICATION

This application claims under 35 U.S.C. § 119(a) the benefit of Korean Patent Application No. 10-2020-0182397 filed on Dec. 23, 2020, the entire contents of which are incorporated by reference herein.

BACKGROUND

(a) Technical Field

The present disclosure relates to a sound control apparatus for a vehicle capable of implementing a separated sound zone in response to a change in position of a passenger, in particular, the passenger's head, and a method of controlling the same.

(b) Description of the Related Art

Separated sound zone (SSZ) technology implemented in a vehicle refers to technology of forming a separated sound zone such that different (separate) sound may be heard in a space corresponding to each seat of the vehicle. This will be described with reference to FIG. 1 (RELATED ART).

Figure 1:
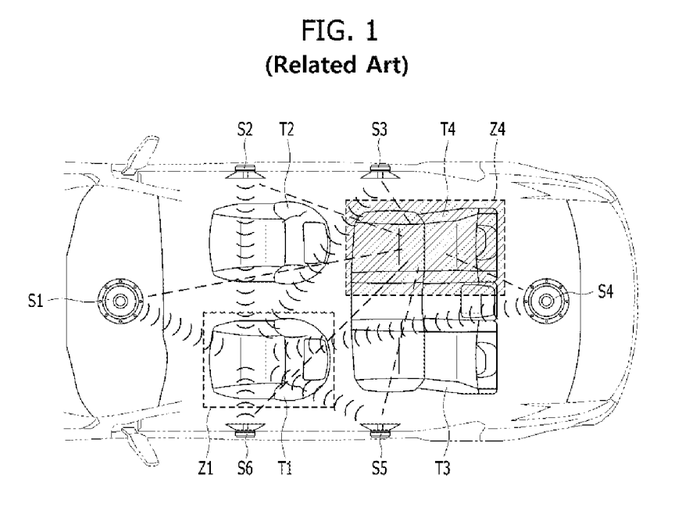
FIG. 1 (RELATED ART) is a view illustrating conventional separated sound zone technology for a vehicle.

FIG. 1 is a view illustrating conventional separated sound zone technology for a vehicle.

Referring to FIG. 1, a plurality of speakers S1, S2, S3, S4, S5, and S6 is disposed at different positions in a vehicle having four seats T1, T2, T3, and T4. When separated sound zone technology is applied in this situation, speaker output may be concentrated on a desired space. To this end, a vehicle audio system may apply, to an original sound, a filter set for each speaker designed such that a sound output target space is determined, sounds output from the plurality of speakers S1, S2, S3, S4, S5, and S6 constructively interfere with each other in the space, and the sounds output from the plurality of speakers S1, S2, S3, S4, S5, and S6 destructively interfere with each other in the remaining spaces excluding the space. In such a filter design, a phase difference between sounds due to differences in relative position between the plurality of speakers S1, S2, S3, S4, S5, and S6 is used.

For example, sounds output from the plurality of speakers S1, S2, S3, S4, S5, and S6 constructively interfere with each other in a first zone Z1 corresponding to a left front seat T1, whereby sound concentration is achieved, and sounds output from the plurality of speakers S1, S2, S3, S4, S5, and S6 destructively interfere with each other in a fourth zone Z4 corresponding to a right rear seat T4, whereby sound transmission is minimized.

The separated sound zone technology is designed such that zones are partitioned based on a relatively large criterion, such as a seat. However, the position of ears of a passenger is changed depending on the physical condition, change in posture, etc. of the passenger, whereby separation characteristics are greatly changed even in the zones. That is, since conventional separated sound zone technology uses only a single control filter set with respect to a single position for each zone, it is difficult to feel the effect of separated sound zone technology depending on the position of the ears of the passenger.

SUMMARY

Accordingly, the present disclosure is directed to a sound control apparatus for a vehicle and a method of controlling the same.

An object of the present disclosure is to provide a sound control apparatus for a vehicle capable of more effectively implementing a separated sound zone and a method of controlling the same.

Another object of the present disclosure is to provide a sound control apparatus for a vehicle capable of controlling a separated sound zone in response to change in position of a head of a passenger and a method of controlling the same.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the disclosure, as embodied and broadly described herein, a separated sound zone control method for a vehicle may include determining a current position of a head of a passenger, and when the determined current head position corresponds to a predicted head position, outputting an output sound datum corresponding to the predicted head position through a plurality of speakers, wherein the output sound datum is selected by applying a sound data sample to a control filter set configured to form a separated sound zone corresponding to the predicted head position.

In another aspect of the present disclosure, a sound control apparatus for a vehicle that implements a separated sound zone may include a control unit configured to generate an output sound datum for implementing a separated sound zone based on a position of a head of a passenger and a plurality of speakers configured to output a sound corresponding to the output sound datum generated by the control unit, wherein the control unit may include a position determination unit configured to determine the current position of the head of the passenger and an output controller configured to, when the determined current head position corresponds to a predicted head position, output the output sound datum corresponding to the predicted head position, and the output sound datum may be selected by applying a sound data sample to a control filter set configured to form a separated sound zone corresponding to the predicted head position.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present disclosure, examples of which are illustrated in the accompanying drawings. The following embodiments are given by way of example in order to enable those skilled in the art to fully understand the idea of the present disclosure. Therefore, the present disclosure is not limited by the following embodiments, and may be realized in various other forms. In order to clearly describe the present disclosure, parts having no relation with the description of the present disclosure have been omitted from the drawings. Wherever possible, the same reference numerals will be used throughout the specification to refer to the same or like parts.

An embodiment of the present disclosure proposes a method of tracking a position of a head of a passenger and outputting a sound to which a control filter set corresponding to the tracked position of the head of the passenger is applied, thereby implementing an optimized separated sound zone function. In addition, the embodiment of the present disclosure proposes a method of tracking the head position through real-time position determination, predicting the head position at a subsequent step, and calculating a control filter set corresponding to the predicted position of the head, thereby minimizing delay time in generating a speaker output sound.

Figure 2A:
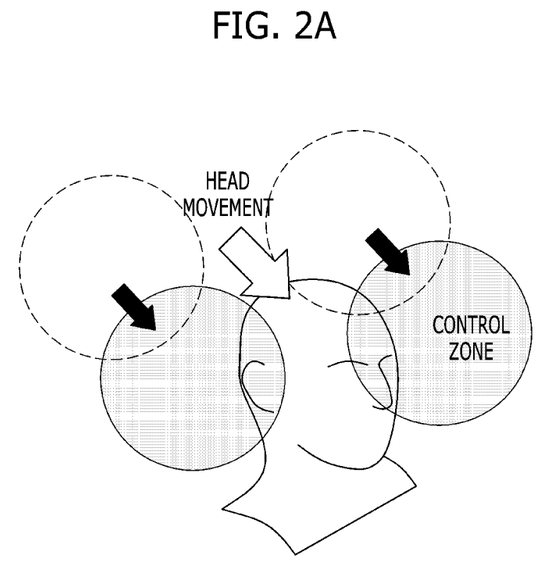
FIG. 2A is a view showing change of a control zone depending on movement of a head.
Figure 2B:
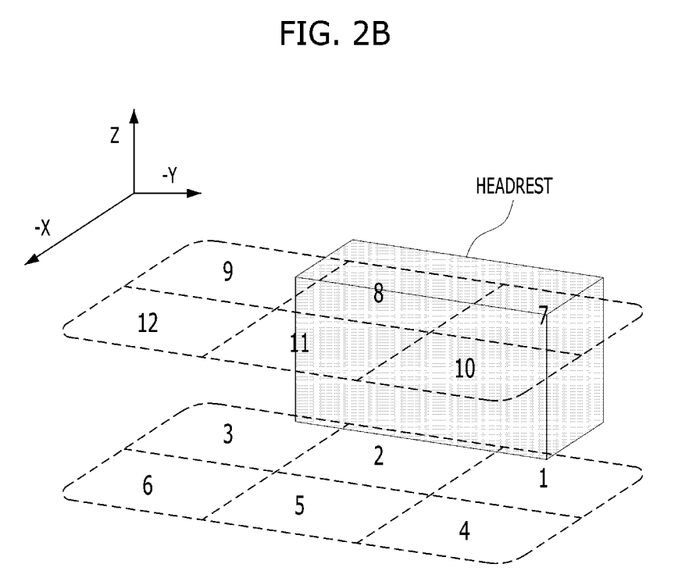
FIG. 2B shows an example of the construction of a control zone for each seat according to an embodiment.

FIG. 2A is a view showing change of a control zone depending on movement of a head, and FIG. 2B shows an example of the construction of a control zone for each seat according to an embodiment.

In conventional separated sound zone technology for a vehicle, a control zone is set for each seat, and a filter set that exhibits an optimum effect at a specific point of the seat is applied. In this embodiment shown in FIG. 2A, however, processing may be performed such that a control zone is changed when the position of the head of the passenger is changed in the same seat. As shown in FIG. 2B, therefore, a plurality of control zones 1 to 12 may be set in a three-dimensional space ahead of a headrest of the seat (a negative x-axis direction). In particular, the plurality of control zones may be set in an x-y plane and may be partitioned along a z-axis. However, the unit and configuration of area partitioning are illustrative, and the present disclosure is not limited thereto.

Hereinafter, the construction of an apparatus for implementing a separated sound zone through tracking of the position of a head will be described with reference to FIG. 3.

Figure 3:
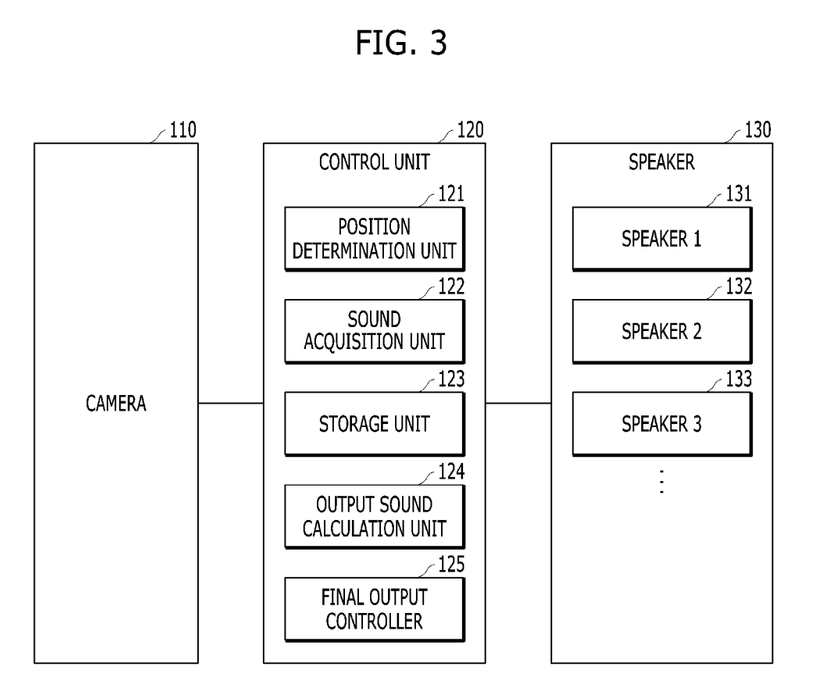
FIG. 3 shows an example of the construction of a sound control apparatus for a vehicle according to an embodiment.

FIG. 3 shows an example of the construction of a sound control apparatus for a vehicle according to an embodiment.

Referring to FIG. 3, the sound control apparatus according to the embodiment may include a camera 110 configured to acquire information necessary to determine the position of a head of a passenger for each seat, a control unit 120 configured to track and predict the position of the head of the passenger based on the information acquired by the camera 110, to apply a control filter set corresponding thereto, and to generate an output signal, and a speaker 130 configured to output a sound according to the output signal of the control unit 120.

The camera 110 may be a single camera disposed around a rear view mirror or at a roof in order to acquire the information necessary to determine the position of the head of the passenger for each seat, or two or more cameras may be provided so as to correspond to seats or control zones. In addition, the camera 110 may be a conventional camera configured to take video or a time-of-flight (TOF) type camera capable of detecting distance change; however, the present disclosure is not limited thereto.

The control unit 120 may include a position determination unit 121, a sound acquisition unit 122, a storage unit 123, an output sound calculation unit 124, and a final output controller 125.

The position determination unit 121 may track change of the position of a head of a passenger for each seat in real time based on the information acquired by the camera 110 and may predict a subsequent position thereof. A position tracking and prediction method will be described in detail with reference to FIGS. 4 to 5B.

The sound acquisition unit 122 acquires sound data for which separated sound zone control is performed. For example, the sound acquisition unit 122 may include an optical medium (CD, DVD, or LD) player, a streaming (BT streaming or IP-based data streaming) data receiver, a radio tuner, an AUX input unit, and a sound file (MP3 or WAV) player; however, the present disclosure is not limited thereto.

The storage unit 123 may store a control filter set for each of a plurality of control zones, and may perform a function of caching a parallel-calculated output sound, a description of which will follow.

The output sound calculation unit 124 may perform convolution in which a control filter set corresponding to each of the current position of the head and at least one predicted subsequent position of the head is applied to sound data. At this time, the output sound calculation unit 124 may be implemented so as to perform parallel calculation, and thus may simultaneously calculate the control filter set corresponding to the current position of the heat and the control filter set corresponding to at least one subsequent position of the head in a parallel manner. Since calculation for applying a control filter set to at least one predicted subsequent position of the head is performed in advance, as described above, reactivity depending on change in position of the head is improved.

The final output controller 125 may selectively transmit an output signal corresponding to a piece of output sound data calculated in advance by the output sound calculation unit 124 and stored in the storage unit 123 or output sound state corresponding to the current position of the head to the speaker 130 depending on whether the current position of the head determined by the position determination unit 121 corresponds to at least one predicted subsequent position of the head. To this end, the final output controller 125 may include at least one output filter, a digital-to-analog converter (DAC), and an audio amplifier; however, the present disclosure is not limited thereto.

The speaker 130 may include a plurality of speakers 131, 132, 133, . . . disposed at different positions of the vehicle, and each of the speakers 131, 132, 133, . . . may output a sound according to an output sound signal output by the control unit 120. That is, the control filter set includes control filters corresponding to the plurality of speakers 131, 132, 133, . . . disposed at different positions, and the output sound data includes output sound data to be output by each of the plurality of speakers 131, 132, 133, . . . in order to implement a separated sound zone.

Hereinafter, a head position tracking and prediction method of the position determination unit 121 will be described with reference to FIGS. 4 to 5B.

The current position of the head of the passenger may be determined in real time based on an image captured by the camera 110. In order to predict the head position at a subsequent step, however, a speed vector of the head position may be used. The speed vector of the head position will be described with reference to FIG. 4.

Figure 4:
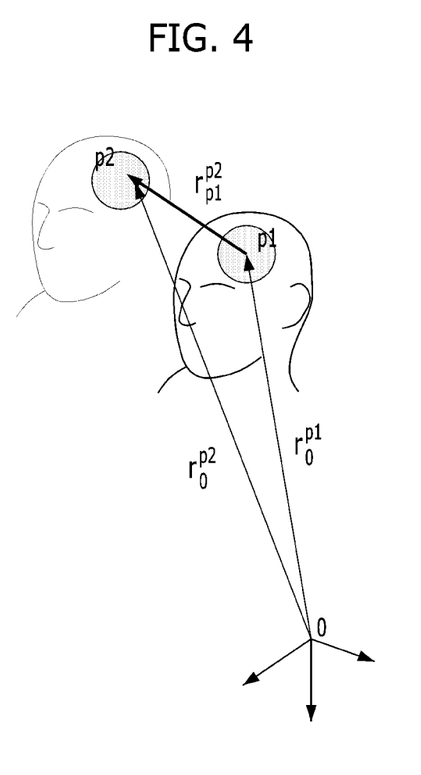
FIG. 4 is a view illustrating the average speed vector of the position of a head of a passenger according to an embodiment.

FIG. 4 is a view illustrating the average speed vector of the position of a head of a passenger according to an embodiment.

Referring to FIG. 4, it is assumed that the position of the head of the passenger is changed from a previous step position p1 to the current step position p2. In this case, in order to calculate the speed vector of the head position, the position determination unit 121 may calculate a vector $r_{p1}^{p2}$ from the previous step position p1 to the current step position p2 based on a vector $r_o^{p1}$ from a predetermined origin 0 to the previous step position p1 and a vector $r_o^{p2}$ from the origin 0 to the current step position p2. Consequently, the vector $r_{p1}^{p2}$ may be differentiated with respect to time to calculate the average speed vector $v_h$, as expressed by Mathematical Expression 1 below.

$$v_h = \frac{dr_{p1}^{p2}}{dt} = \frac{r^{p2} - r^{p1}}{t_2 - t_1}$$ [Mathematical Expression 1]

Figure 5A:
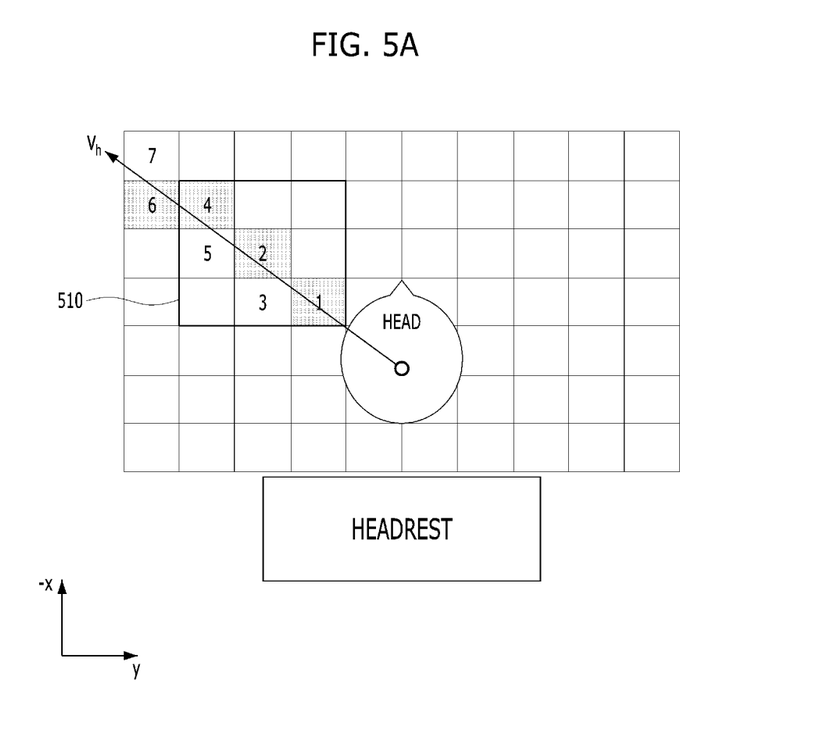
FIG. 5A is a view illustrating a passenger head position estimation concept according to an embodiment.
Figure 5B:
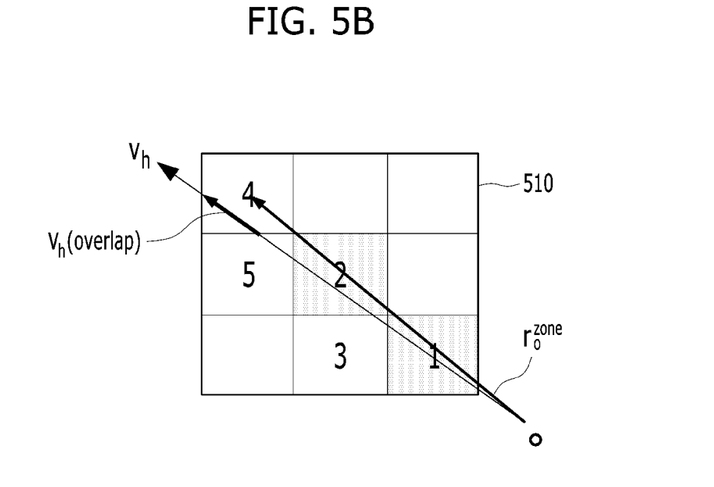
FIG. 5B is an enlarged view of area 510 of FIG. 5A.

FIG. 5A is a view illustrating a passenger head position estimation concept according to an embodiment, and FIG. 5B is an enlarged view of area 510 of FIG. 5A. For convenience of description, a z-axis is omitted from FIGS. 5A and 5B, whereby a two-dimensional orthogonal coordinate system is shown.

After the average speed vector $v_h$ is calculated, the average speed vector $v_h$ is substituted based on the current step position of the head, as shown in FIG. 5A, whereby the position determination unit 121 may determine a control zone overlapping the vector.

When there is a plurality of control zones overlapping the average speed vector, the position determination unit 121 may set priorities for the plurality of control zones overlapping the average speed vector. For example, when five control zones 1, 2, 3, 4, and 5 overlap the average speed vector in area 510 shown in FIG. 5A, the position determination unit 121 may set priorities based on the distance from the current step head position 0 to the center of the control zone and the overlapping length between the average speed vector and the control zone for each control zone. For example, for the fourth control zone, a priority score prio may be determined based on a vector $r_o^{zone}$ from the current step head position 0 to the center of the control zone and a vector $v_h$(overlap) of the portion of the average speed vector overlapping the control zone, as expressed by Mathematical Expression 2 below.

$$\text{prio} = (\alpha |r_o^{zone}|)^{-1} + \beta |v_h(\text{overlap})|$$ [Mathematical Expression 2]

That is, referring to Mathematical Expression 2, as the distance from the head position 0 to the center of the control zone decreases and the overlapping length between the speed vector and the control zone increases, the priority score increases. Here, $\alpha$ and $\beta$ are weights given to the distance from the head position 0 to the center of the control zone and the overlapping length between the speed vector and the control zone, respectively, and may be variously set.

In summary, the position determination unit 121 may calculate the average speed vector of the head position using the above method, may predict the control zone overlapping the average speed vector as the head position in a subsequent step, and, when there is a plurality of control zones overlapping the average speed vector, may determine priorities for the control zones overlapping the average speed vector.

Meanwhile, when the priorities are determined, the position determination unit 121 may select a predetermined number of control zones from among the plurality of control zones overlapping the average speed vector in order of priority scores, and may notify the output sound calculation unit 124 of the same.

Figure 6:
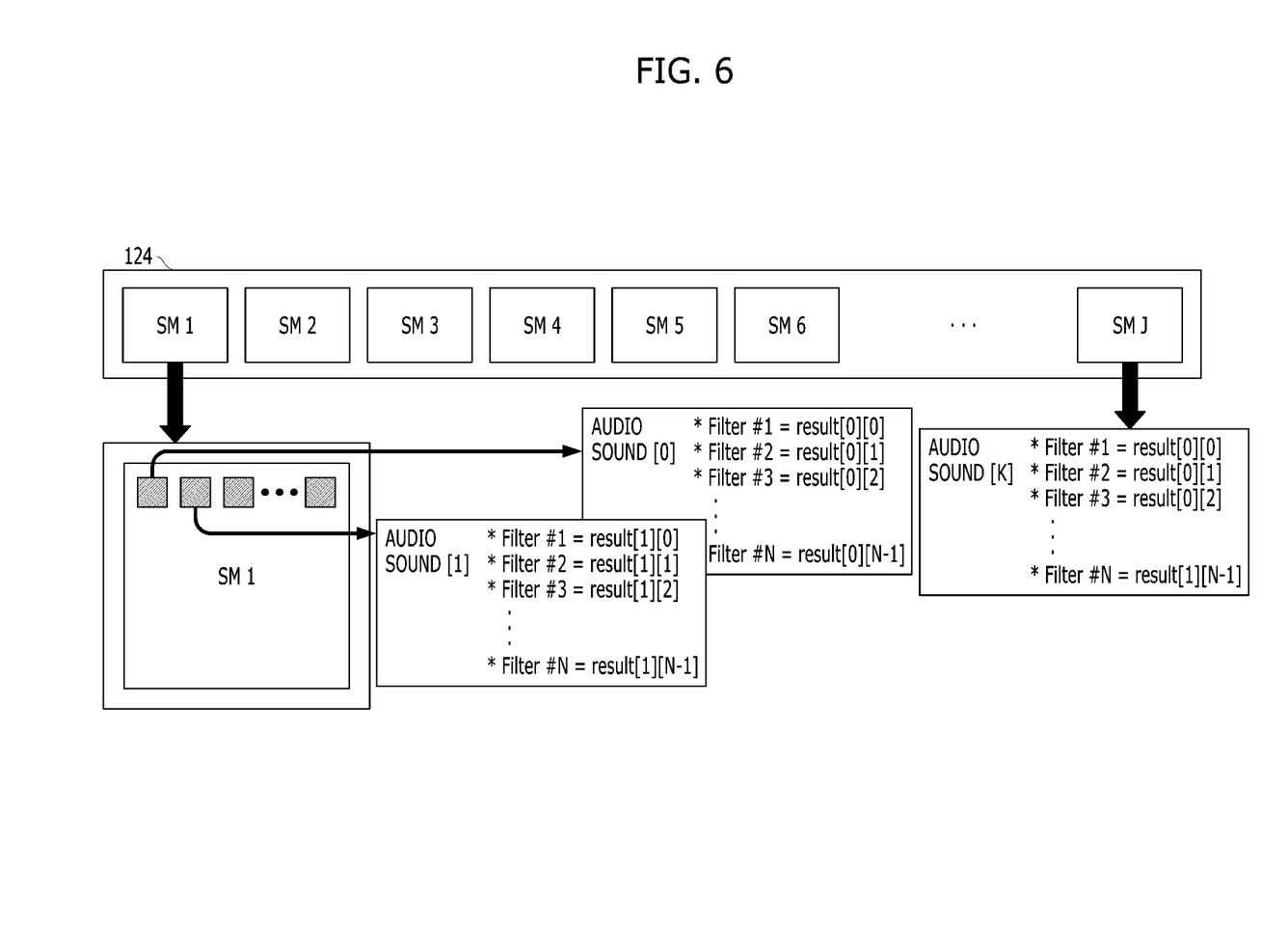
FIG. 6 shows an example of the construction and operation of an output sound calculation unit according to an embodiment.

FIG. 6 shows an example of the construction and operation of an output sound calculation unit according to an embodiment.

Referring to FIG. 6, the output sound calculation unit 124 may have a plurality of calculation unit processors SM 1, SM 2, SM 3, . . . , and SM J. Each calculation unit processor may be implemented in the form of a GPU core, such as a streaming multiprocessor (SM), which, however is illustrative. The present disclosure is not limited thereto, and the kind of the calculation unit processor is not restricted as long as it is possible to simultaneously calculate a plurality of calculation targets in a parallel manner.

Since the output sound calculation unit 124 has a plurality of calculation unit processors, the output sound calculation unit may simultaneously perform convolution between a control filter set corresponding to each of the current head position and/or each of a plurality of control zones predicted by the position determination unit 121 as a head position in a subsequent step and sound data. Consequently, simultaneous calculation performance is improved, compared to a digital signal processor (DSP) type calculation unit of a conventional sound processing apparatus.

For example, on the assumption that sound data are divided into K samples, the number of control filter sets is N, and the number of calculation unit processors is J, each sample of the sound data is convoluted by a separate GPU core in a parallel manner, as shown in FIG. 6, whereby calculation acceleration is possible.

Figure 7:
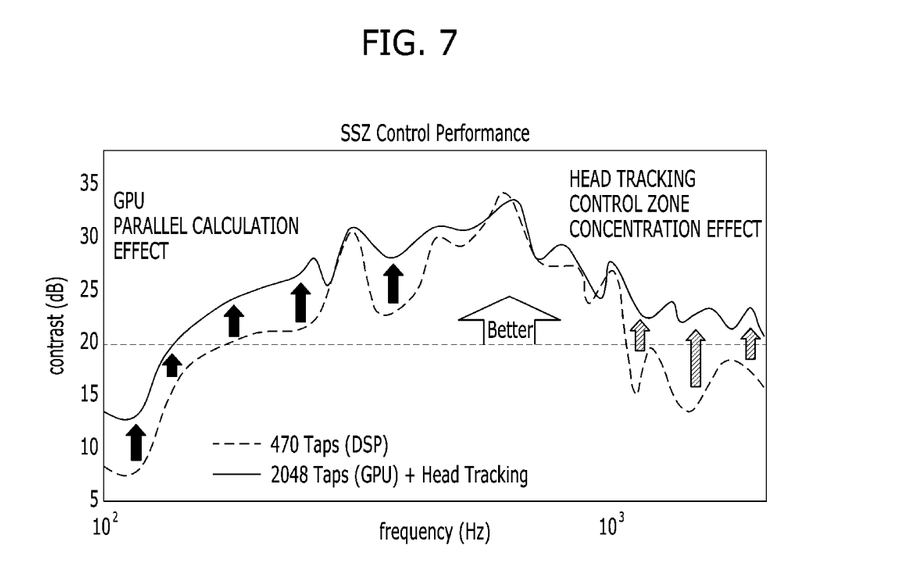
FIG. 7 shows a separated sound zone control effect according to an embodiment.

FIG. 7 shows a separated sound zone control effect according to an embodiment.

When the output sound calculation unit 124 having the structure of FIG. 6 and head tracking are applied together, it can be seen that performance in contrast between a dark zone and a bright zone is improved due to a parallel calculation effect in a low frequency domain and due to a head tracking effect in a high frequency domain, compared to calculation through a general DSP, as shown in FIG. 7.

Figure 8:
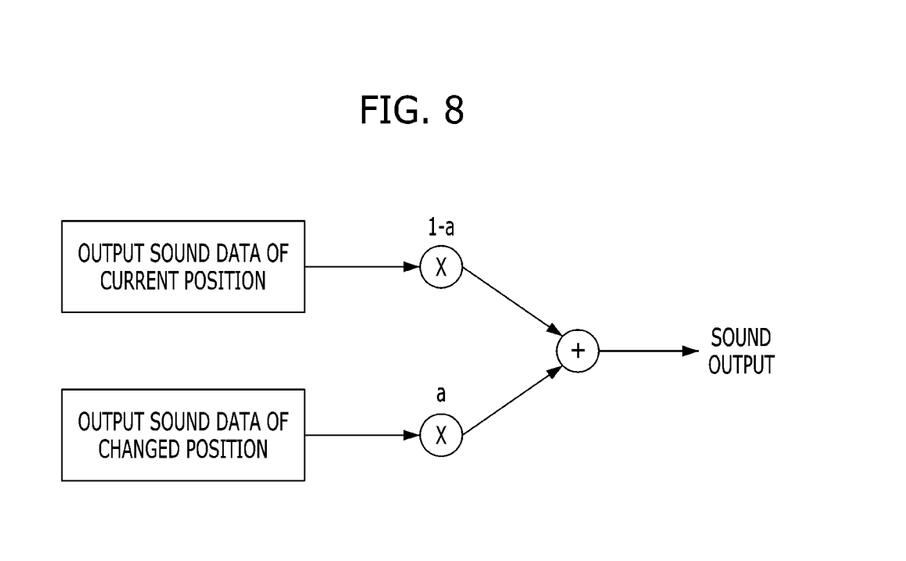
FIG. 8 shows an example of a cross fading application configuration according to an embodiment.

FIG. 8 shows an example of a cross fading application configuration according to an embodiment.

Upon recognizing a change in head position as a result of determination of the position determination unit 121, in order to prevent discontinuity in speaker output due to change of the control filter set, as shown in FIG. 8, the final output controller 125 may apply a weight of 1-a to output sound data corresponding to a previous position and a weight of a to output sound data corresponding to a changed position, may synthesize the same, and may transmit the synthesized output sound data to the speaker 130 as final output sound data. That is, a cross fading effect may be applied. Here, "a" is a value increasing from 0 to 1 over time. A predetermined value may be used as variance over time, or the variance over time may be proportional to the average speed vector of the head position.

Operations according to each of the embodiments described above will be described with reference to the flowchart of FIG. 9.

Figure 9:
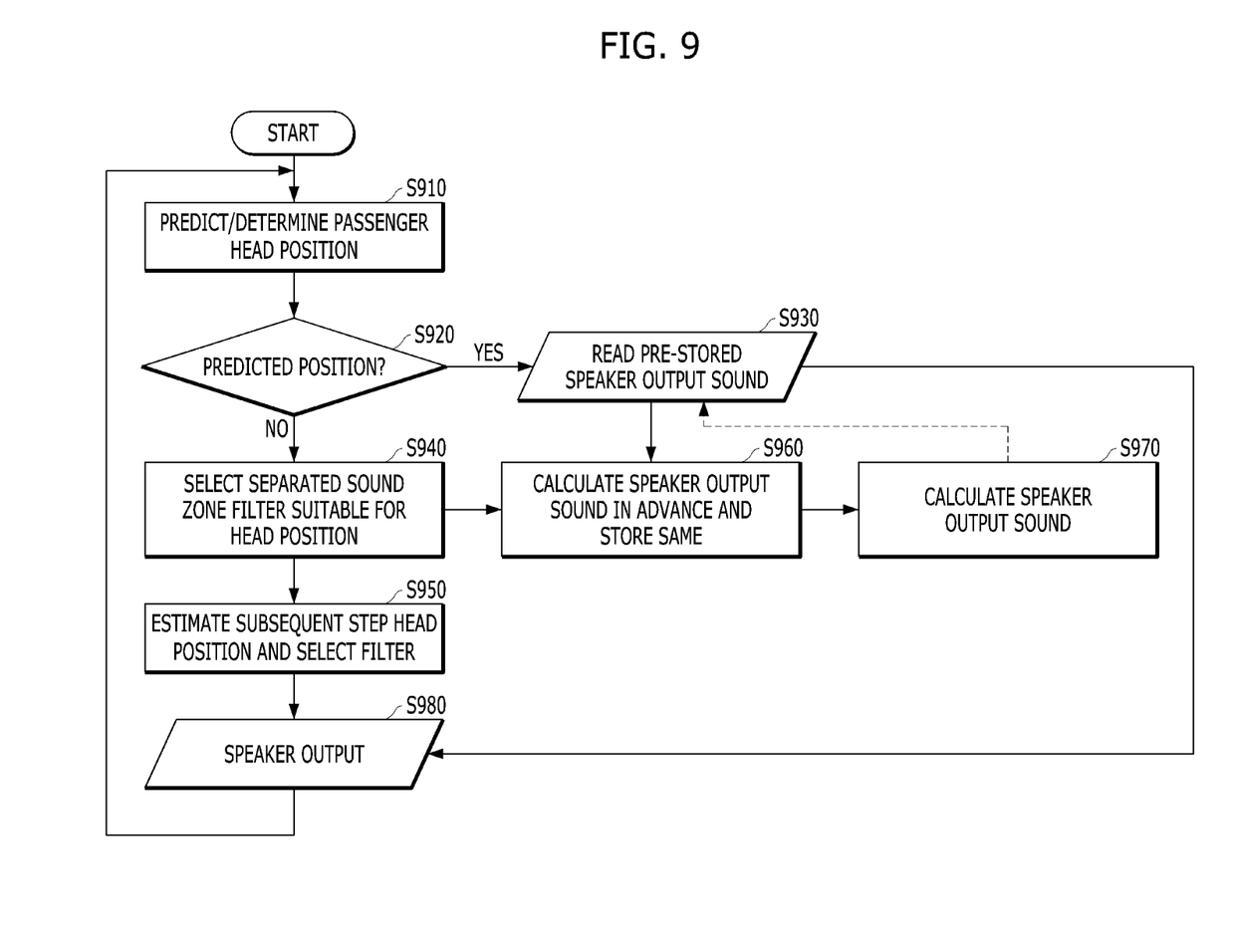
FIG. 9 is a flowchart showing an example of operation of a sound control apparatus for a vehicle according to an embodiment.

FIG. 9 is a flowchart showing an example of operation of a sound control apparatus for a vehicle according to an embodiment.

Referring to FIG. 9, first, the position determination unit 121 may determine the current head position based on information acquired by the camera 110 and may predict the head position in a subsequent step (S910). Here, the step may be unit time of head position determination/prediction of the position determination unit 121 or a divided sample length in calculating audio sound data, which, however is an illustrative, and the present disclosure is not limited thereto.

The final output controller 125 may determine whether the currently determined head position corresponds to the head position predicted in a previous step (S920). That is, this step may be a process of determining whether there is a control zone corresponding to the current head position among control zones having high priorities and thus becoming a target for which output sound data are generated by the output sound calculation unit 124, among at least one head position predicted for the current step in a previous step.

When the current head position corresponds to any one of positions predicted in the previous step (YES of S920), since output sound data calculated in advance by the output sound calculation unit 124 in the previous step are stored in the storage unit 123, the final output controller 125 may read the data (S930) and may output the same through the speaker 130 (S980).

When the current head position does not correspond to any one of positions predicted in the previous step (NO of S920), on the other hand, the output sound calculation unit 124 may immediately select a control filter set corresponding to the current head position (S940), and may perform convolution with sound data (S950). The calculation result may be transmitted to the speaker 130 through the final output controller 125 (S980).

Meanwhile, when a processing scheme for the current step is determined (S930 or S940), the position determination unit 121 may predict the head position in a subsequent step, and the output sound calculation unit 124 may select a control filter set corresponding to each of positions having a predetermined number of priority scores (S960). The output sound calculation unit 124 may apply sound data corresponding to a subsequent step to each control filter set selected through parallel calculation to calculate output sound data, and may store the same in the storage unit 123 (S970). In particular, as previously described, output sound data for a predicted position in a subsequent step predicted in the current step may be prepared in advance, and, when the head position determined in the subsequent step corresponds to any one of positions predicted in the current step, the prepared output sound data may be immediately output.

The present disclosure described above may be implemented as a computer-readable program stored in a computer-readable recording medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

As is apparent from the above description, a sound control apparatus for a vehicle related to at least one embodiment of the present disclosure is capable of more effectively implementing a separated sound zone.

Particularly, in the present disclosure, the position of a head of a passenger is tracked and predicted to apply an optimum filter set, and speaker output values for a plurality of head positions are prepared in advance based on parallel calculation, whereby it is possible to effectively cope with change in head position.

What is claimed is:

1. A separated sound zone control method for a vehicle, the separated sound zone control method comprising the steps of:
   determining a current position of a head of a passenger;
   determining a first predicted head position based on the current position; and
   determining a first output sound datum according to the first predicted head position,
   wherein determining the first output sound datum comprises, when the determined current head position corresponds to a second predicted head position determined previously, outputting a second output sound datum determined according to the second predicted head position through a plurality of speakers, and
   wherein the first output sound datum is selected by applying a sound data sample to a control filter set configured to form a separated sound zone corresponding to the first predicted head position.

2. The separated sound zone control method according to claim 1, further comprising carrying out a prediction step to determine the first predicted head position.

3. The separated sound zone control method according to claim 2, wherein the prediction step comprises:
   calculating an average speed vector for the head of the passenger;
   determining at least one control zone overlapping the average speed vector among a plurality of control zones; and
   determining a predetermined number of control zones, among the at least one control zone overlapping the average speed vector, to be the current head position.

4. The separated sound zone control method according to claim 3, wherein the step of determining the predetermined number of control zones comprises:
   determining a priority score for each of the at least one control zone overlapping the average speed vector; and
   determining the predetermined number of control zones to be the current head position in order of high to low priority scores.

5. The separated sound zone control method according to claim 4, wherein the step of determining the priority score is performed for each of the at least one control zone overlapping the average speed vector based on a distance from the determined current head position and an overlapping length of the average speed vector.

6. The separated sound zone control method according to claim 2, further comprising generating the first output sound datum in advance for the first predicted head position using a relevant control filter set and a sound data sample.

7. The separated sound zone control method according to claim 6, wherein the step of generating the first output sound datum in advance is comprises generating a plurality of output sound data simultaneously for a plurality of predicted head positions through parallel calculation.

8. The separated sound zone control method according to claim 1, further comprising, when the determined current head position does not correspond to the second predicted head position, selecting a control filter set corresponding to the current head position and generating the first output sound datum.

9. The separated sound zone control method according to claim 1, wherein:
   the plurality of speakers is disposed at different positions of the vehicle,
   the control filter set comprises a control filter for each of the plurality of speakers disposed at the different positions, and
   the first output sound datum comprises an output sound for each of the plurality of speakers disposed at the different positions.

10. A non-transitory computer-readable recording medium containing a program for performing the separated sound zone control method according to claim 1.

11. A sound control apparatus for a vehicle that implements a separated sound zone, the sound control apparatus comprising:
    a control unit configured to generate an output sound datum for implementing a separated sound zone based on a position of a head of a passenger; and
    a plurality of speakers configured to output a sound corresponding to the output sound datum generated by the control unit,
    wherein the control unit comprises:
    a position determination unit configured to determine a current position of the head of the passenger, a first predicted head position based on the current position, and a first output sound datum according to the first predicted head position; and
    an output controller configured to, when the determined current head position corresponds to a second predicted head position determined previously, output a second output sound datum according to the second predicted head position, and
    the first output sound datum is selected by applying a sound data sample to a control filter set configured to form a separated sound zone corresponding to the first predicted head position.

12. The sound control apparatus according to claim 11, wherein the position determination unit determines the first predicted head position of the passenger.

13. The sound control apparatus according to claim 12, wherein the position determination unit calculates an average speed vector for the head of the passenger, determines at least one control zone overlapping the average speed vector among a plurality of control zones, and determines a predetermined number of control zones, among the at least one control zone overlapping the average speed vector, to be the current head position.

14. The sound control apparatus according to claim 13, wherein the position determination unit determines a priority score for each of the at least one control zone overlapping the average speed vector and determines the predetermined number of control zones to be the current head position in order of high to low priority scores.

15. The sound control apparatus according to claim 14, wherein the position determination unit determines the priority score for each of the at least one control zone overlapping the average speed vector based on a distance from the determined current head position and an overlapping length of the average speed vector.

16. The sound control apparatus according to claim 12, wherein the control unit further comprises an output sound calculation unit configured to calculate the first output sound datum in advance for the first predicted head position using a relevant control filter set and a sound data sample.

17. The sound control apparatus according to claim 16, wherein the output sound calculation unit simultaneously calculates a plurality of output sound data for a plurality of predicted head positions through parallel calculation.

18. The sound control apparatus according to claim 16, wherein when the determined current head position does not correspond to the second predicted head position, the output sound calculation unit selects a control filter set corresponding to the current head position and generates the first output sound datum.

19. The sound control apparatus according to claim 11, wherein:
- the plurality of speakers is disposed at different positions of a vehicle,
- the control filter set comprises a control filter for each of the plurality of speakers disposed at the different positions, and
- the first output sound datum comprises an output sound for each of the plurality of speakers disposed at the different positions.

* * * * *